(12) United States Patent
Schwertfeger et al.

(10) Patent No.: US 6,699,808 B1
(45) Date of Patent: Mar. 2, 2004

(54) HIGH-SOLIDS SIO₂ DISPERSIONS, PROCESS FOR PRODUCING THEM, AND THEIR USE

(75) Inventors: Fritz Schwertfeger, Mühldorf (DE); Johann Weis, Sauerlach (DE); Peter Ritter, Durach (DE); Achim Molter, Dietmannsried (DE); Wolfgang Schweren, Kempten (DE); Volker Frey, Burghausen (DE); Hans-Peter Scherm, Emmerting (DE)

(73) Assignee: Wacker-Chemie GmbH, Munich (DE)

( * ) Notice: Subject to any disclaimer, the term of this patent is extended or adjusted under 35 U.S.C. 154(b) by 16 days.

(21) Appl. No.: 10/070,082

(22) PCT Filed: Sep. 7, 2000

(86) PCT No.: PCT/EP00/08752

§ 371 (c)(1),
(2), (4) Date: Mar. 1, 2002

(87) PCT Pub. No.: WO01/17902

PCT Pub. Date: Mar. 15, 2001

(30) Foreign Application Priority Data

Sep. 9, 1999 (DE) ......................................... 199 43 103

(51) Int. Cl.⁷ ............................. C03C 8/16; C03C 3/06; C01B 33/12; C03B 37/016
(52) U.S. Cl. ............................. 501/20; 501/54; 501/55; 501/21; 423/335; 423/339; 65/395; 65/398
(58) Field of Search .................................. 423/335, 338, 423/339; 501/12, 20, 54, 55, 80, 133, 128, 154, 21; 65/395, 398

(56) References Cited

U.S. PATENT DOCUMENTS

| | | |
|---|---|---|
| 4,018,615 A | 4/1977 | Mills |
| 4,033,780 A | 7/1977 | Beaumgartner et al. |
| 4,047,966 A | 9/1977 | Bihuniak et al. |
| 4,929,579 A | 5/1990 | Lassiter |
| 4,979,971 A | 12/1990 | Kyoto et al. |
| 5,053,359 A | 10/1991 | Loxley et al. |
| 5,389,582 A | 2/1995 | Loxley et al. |
| 5,578,101 A | 11/1996 | Blonder et al. |
| 5,655,046 A | 8/1997 | Todoroki et al. |
| 5,696,041 A | 12/1997 | Collins et al. |
| 6,071,487 A | 6/2000 | Campion et al. |

FOREIGN PATENT DOCUMENTS

| | | |
|---|---|---|
| DE | 2 218 766 | 12/1972 |
| DE | 37 41 393 A1 | 6/1989 |
| DE | 44 40 104 C2 | 4/1996 |
| DE | 197 10 672 C2 | 1/1999 |
| EP | 0 318 100 A2 | 5/1989 |
| EP | 0 199 787 B1 | 3/1990 |
| EP | 0 705 797 A2 | 4/1996 |
| EP | 0 473 104 B1 | 11/1996 |
| EP | 0 753 605 A1 | 1/1997 |
| EP | 0 653 381 B1 | 4/1998 |
| EP | 0 891 946 A1 | 1/1999 |
| GB | 1 428 788 | 3/1976 |
| GB | 2 329 893 | 11/1999 |
| JP | 52 39049 B | * 10/1977 |
| JP | 5-294610 | 11/1993 |

OTHER PUBLICATIONS

English Derwent Abstract AN 1995–186955 [25] Corresponding To DE 44 40 104.
English Derwent Abstract AN 1989–179259 [25] Corresponding To DE 37 41 393 A.
English Derwent Abstract AN 1995–053160 [8] Corresponding To EP 0 653 381 B.
English Derwent Abstract AN 1977–770234 [43] Corresponding To JP 52 039 049 B.
English Derwent Abstract AN 1972–80460T [51] Corresponding To DE 2 218 766.
English Derwent Abstract AN 1993–392363 [49] Corresponding To JP 5 294 610.
English Derwent Abstract AN 1997–483090 [45] Corresponding To DE 197 10 672.

* cited by examiner

*Primary Examiner*—David Sample
*Assistant Examiner*—Elizabeth A Bolden
(74) *Attorney, Agent, or Firm*—Brooks Kushman P.C.

(57) ABSTRACT

Extremely high solids content silica dispersions are useful for forming green bodies of near net shape as compared to the shape of the bodies after sintering. The green bodies are particularly useful for sintering to form low impurity-containing crucibles for single crystal silicon production.

27 Claims, 2 Drawing Sheets

100 μm

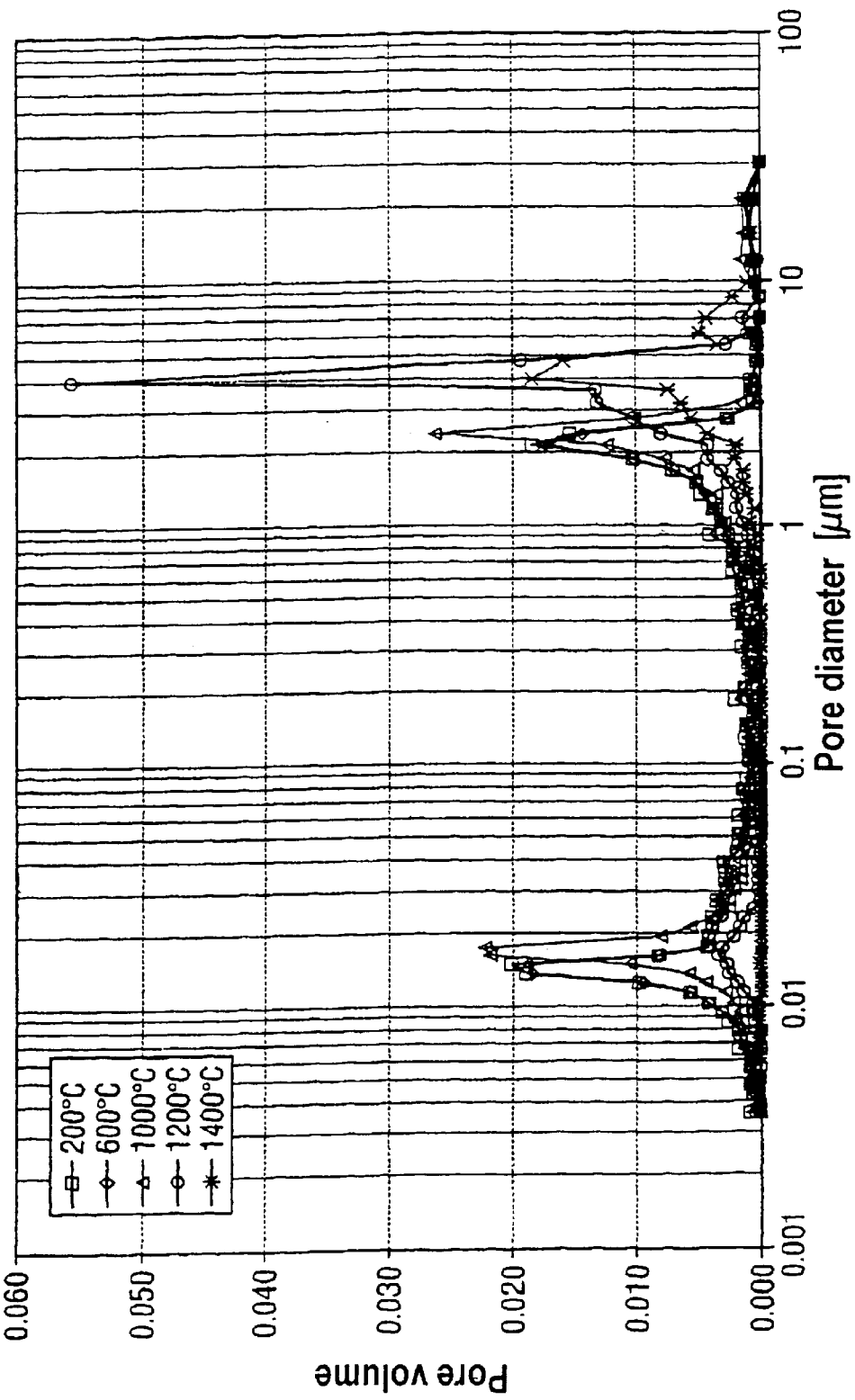

HIGH-SOLIDS SIO$_2$ DISPERSIONS, PROCESS FOR PRODUCING THEM, AND THEIR USE

BACKGROUND OF THE INVENTION

1. Field of the Invention

The invention relates to high-solids SiO$_2$ dispersions, a process for producing it and also a process for producing porous amorphous shaped SiO$_2$ bodies having an extremely high solids content, these shaped bodies and their production.

2. Description of the Related Art

Porous, amorphous shaped SiO$_2$ bodies are used in many industrial fields. Examples which may be mentioned are filter materials, thermal insulation materials and heat shields.

In addition, fused silica goods of all types can be produced from amorphous, porous shaped SiO$_2$ bodies by sintering and/or melting. Highly pure porous shaped SiO$_2$ bodies can serve, for example, as "preform" for glass fibers or optical fibers. Furthermore, crucibles for drawing single silicon crystals can also be produced in this way.

Regardless of the use of the porous shaped bodies, efforts are always made to produce a shaped body which is as close as possible to the final dimensions. This means that little if any shrinkage may occur during production of the shaped body.

Porous shaped SiO$_2$ bodies can in principle be produced by pressing of appropriate SiO$_2$ powders or by way of a wet chemical process.

In the processes known from the ceramics field for pressing powders, e.g. cold or hot isostatic pressing processes, it is generally necessary to add organic binders in order to obtain a strong green body. These binders have to be leached out again or burnt in a later step. This is technically complicated, expensive and leads to undesired impurities which, particularly in the production of crucibles for drawing single silicon crystals, have to be avoided at all costs.

The preferred way of producing porous shaped SiO$_2$ bodies is therefore the wet chemical route. A process known from the literature is the sol-gel process. This generally starts from silicon-containing monomers dissolved in solvents (sol) which are converted by means of hydrolysis and/or polycondensation into a nanoporous three-dimensional SiO$_2$ network (gel). The porous shaped body is then obtained by subcritical or supercritical drying. Apart from the usually expensive starting materials, this process can only produce gels having a solids content of about 10–20% by weight. Subcritical drying therefore results in extremely high shrinkage, as a result of which shaped bodies close to the final dimensions cannot be produced reproducibly. If supercritical drying is carried out, the shaped body does not shrink but it then has a solids content of only 10–20% by weight.

One way of obtaining shaped SiO$_2$ bodies having a higher solids content is described in EP 705797. Here, finely divided silica particles (fumed silica) are added to the sol. This enables a solids content of about 40% by weight to be obtained. However, the preparation of the sol is still expensive and drying is complicated.

A further method is described in EP 318100. Here, a dispersion of finely divided silica (fumed silica) having particle sizes in the range 10–500 nm in water is prepared. After shaping and solidification of the dispersion, the corresponding shaped body is obtained by means of drying. This gives solids contents of up to 60% by weight.

EP 653381 and DE-A 2218766 disclose a slip casting process in which a dispersion of fused silica articles having a particle size of from 0.45 to 70 μm, preferably 1–10 μm, in water is prepared. The achievable solids content of the dispersion is from 78 to 79% by weight. The dispersion is subsequently solidified in a porous mold by slow withdrawal of water and is dried after removal from the mold. Although shaped bodies having quite high solids contents can be produced by this process, the slip casting process is very time-consuming due to the diffusion-dependent withdrawal of water and can only be employed for thin-walled shaped bodies. Furthermore, the solidification by withdrawal of water by means of porous molds leads to an undesirable density gradient within the shaped body, which during later sintering causes differing sintering temperatures, sintering times and also density differences.

If a complicated slip casting process is to be avoided and shaped bodies as close as possible to the final dimensions are nevertheless to be produced, dispersions having an extremely high solids content have to be realized. In practice, this leads to great problems, since dispersed SiO$_2$ particles have a strong thixotropic effect. During the dispersion procedure, a dilatant phase occurs. This is shown by a rise in the viscosity of the suspension with increasing shear. In order to obtain a high-solids dispersion which is still pourable, it is necessary to employ a complicated process with a change from low shear during stirring-in and high shear during homogenization. Due to the very rapid solidification of such a high-solids suspension, problems are also encountered in achieving homogeneous shaping of the dispersion.

GB-B-2329893 discloses a composition for producing vitreous silica, which composition contains pyrogenic silica having a mean particle diameter of from $5\times10^{-3}$ to $1\times10^{-1}$ μm and a specific surface area of from 50 to 400 m$^2$/g and also heat-treated silica, as agglomerate of a pyrogenic silica, having a mean diameter of from 2 to 15 μm and a lower specific surface area than the pyrogenic silica together with plasticizer (e.g. tetramethylammonium hydroxide), dispersant (e.g. polyethyloxazoline, glycerol) and binder (e.g. methyl formate). Due to its content of different organic and/or inorganic additives, such a composition is quite unsuitable for producing highly pure sintered bodies. In addition, solids contents of only up to 51% by weight of solids are achieved in the compositions disclosed in this document and the green bodies resulting therefrom.

JP 5294610 discloses a process for producing amorphous shaped SiO$_2$ bodies which have a solids content of up to 80% by weight. Here, SiO$_2$ particles having a mean particle diameter of from 0.1 to 100 μm are used. To be able to achieve such high solids contents at all, the particles have to be dispersed in basic water (pH>10, e.g. by means of TMAH) by means of application of high shear for a long time (e.g. ball mill). Owing to the unavoidable contamination due to the use of bases and abrasion (abrasive nature of the SiO$_2$ particles) during the long and intensive shear process, such a composition is completely unsuitable for producing high-purity shaped SiO$_2$ bodies.

U.S. Pat. No. 4,929,579 discloses a process by means of which refractory articles are produced from silica using a dispersion containing amorphous SiO$_2$ particles having a trimodal particle size distribution. Such a dispersion is very complicated to prepare. In addition, owing to the proportion of very large particles (mean particle diameter>300 μm), inhomogeneities in the dispersion and sedimentation phenomena occur. This leads to density fluctuations within the dispersion or the shaped bodies, which results in considerable difficulties in respect of shape accuracy and isotropic shrinkage during subsequent shaping processes and sintering.

SUMMARY OF THE INVENTION

It is an object of the present invention to provide a homogeneous and very readily pourable dispersion which has a high solids content of $SiO_2$ particles and does not have the disadvantages known from the prior art.

This object is achieved by a homogeneous dispersion of amorphous $SiO_2$ particles in a dispersion medium, wherein the dispersion has a solids content of at least 80% by weight of amorphous $SiO_2$ particles and the amorphous $SiO_2$ particles have a bimodal particle size distribution.

DETAILED DESCRIPTION OF THE PREFERRED EMBODIMENTS

The dispersion preferably has a solids content of at least 83% by weight of amorphous $SiO_2$ particles.

The dispersion particularly preferably has a solids content of at least 86% by weight of amorphous $SiO_2$ particles.

The upper limit of the solids content of amorphous $SiO_2$ particles is preferably about 95% by weight when water is used as dispersion medium or a corresponding value when a dispersion medium having a different density is used.

As dispersion medium, it is possible for polar or nonpolar organic solvents, e.g. alcohols, ethers, esters, organic acids, saturated or unsaturated hydrocarbons, or water or mixtures thereof to be present.

Alcohols such as methanol, ethanol or propanol or acetone or water or mixtures thereof are preferably present. Particular preference is given to acetone and water or mixtures thereof, very particularly preferably water.

The above-described dispersion media are particularly preferably used in high-purity form, as can be obtained, for example, by methods known from the literature or are commercially available.

When using water, preference is given to using specially purified water which has a resistance of $\geq 18$ megaohm*cm.

A mineral acid, e.g. HCl, HF, $H_3PO_4$, $H_2SO_4$ or silicic acid, or ionogenic additives, e.g. fluorinated salts, are preferably added to the water. Particular preference is given to the addition of HCl or HF, very particularly preferably HF. It is also possible to use mixtures of the compounds mentioned. The resulting pH of the dispersion should be 2–7, preferably 3–5.

As a likewise preferred alternative, a mineral base, e.g. $NH_3$, NaOH or KOH, can be added to the water. Particular preference is given to $NH_3$ and NaOH, very particularly preferably $NH_3$. However, mixtures of the compounds mentioned can also be used. The resulting pH should be 7–11, preferably 9–10.

The reduction or increase in the pH leads to a reduction in the thixotropy, so that a high solids content can be achieved and the dispersion is more fluid and easier to shape.

The relatively large amorphous $SiO_2$ particles preferably have an essentially round, i.e. spherical, and compact morphology, as can be seen, for example, in FIG. 1.

The relatively large amorphous $SiO_2$ particles preferably have a particle size distribution with a $d_{50}$ of 1–200 μm, preferably 1–100 μm, particularly preferably 10–50 μm and very particularly preferably 10–30 μm. Furthermore, a very narrow particle size distribution is advantageous.

Preference is given to amorphous $SiO_2$ particles having a BET surface area of 0.001 $m^2/g$–50 $m^2/g$, particularly preferably 0.001 $m^2/g$–5 $m^2/g$, very particularly preferably 0.01 $m^2/g$–0.5 $m^2/g$.

The bimodal particle size distribution is obtained by mixing in amorphous $SiO_2$ particles, e.g. fused or fumed silica, having a particle size of from 1–400 nm, preferably from 10 to 200 nn, particularly preferably from 50 to 130 nm, in an amount of from 0.1 to 50% by weight, based on the total solids content of the dispersion, particularly preferably in an amount of from 1 to 30% by weight, very particularly preferably in an amount of from 1 to 10% by weight.

These amorphous $SiO_2$ particles preferably have a BET surface area of from 30 to 400 $m^2/g$, particularly preferably from 130 to 300 $m^2/g$.

These nanosize amorphous $SiO_2$ particles function as a type of inorganic binder between the significantly larger $SiO_2$ particles, but not as filler to achieve a significantly higher solids content. They enable withdrawal of water to be essentially omitted in the production of strong shaped bodies. Furthermore, they influence the viscosity or the plastic behavior of the dispersion.

The specific density of the amorphous $SiO_2$ particles is preferably in the range from 1.0 to 2.2 $g/cm^3$. The particles particularly preferably have a specific density of from 1.8 to 2.2 $g/cm^3$. In particular, the particles have a specific density of from 2.0 to 2.2 $g/cm^3$.

Furthermore, preference is given to amorphous $SiO_2$ particles having $\leq 3$ OH groups per $nm^2$ on their external surface, particularly preferably $\leq 2$ OH groups per $nm^2$ and very particularly preferably $\leq 1$ OH group per $nm^2$.

The amorphous $SiO_2$ particles preferably contain not more than 1% of crystalline material. Furthermore, they preferably display a very low interaction with the dispersion medium.

These properties are displayed by amorphous $SiO_2$ particles of differing origin, e.g. post-sintered silica (fused silica) and any type of amorphous sintered or compacted $SiO_2$. They are therefore preferred for producing the dispersion of the invention.

Appropriate material can be produced in a manner known per se in an oxygen/hydrogen flame. It is also commercially available, e.g. under the trade name Excelica® from Tokoyama, Japan.

When the above criteria are met, it is also possible to use particles of a different origin, e.g. natural quartz, fused silica sand, vitreous silica, ground fused silica or ground fused silica scrap, and also chemically produced vitreous silica, e.g. precipitated silica, finely divided silica (fumed silica produced by means of pyrolysis in a flame), xerogels or aerogels.

The relatively large amorphous $SiO_2$ particles are preferably precipitated silicas, finely divided silicas, fused silica or compacted $SiO_2$ particles, particularly preferably finely divided silica or fused silica, very particularly preferably fused silica. Mixtures of the different $SiO_2$ particles mentioned are likewise possible and preferred.

In a particular embodiment, the above-described particles are present in highly pure form, i.e. having an extraneous atom content, in particular of metals, of $\leq 300$ ppmw (parts per million by weight), preferably $\leq 100$ ppmw, particularly preferably $\leq 10$ ppmw and very particularly preferably $\leq 1$ ppmw.

In a further preferred embodiment, additives such as glass fibers, crushed glass or glass particles can also be added to the dispersion. Preference is given to adding fused silica fibers.

In a further specific embodiment, the dispersion can additionally contain metal particles, metal compounds or metal salts. Preference is here given to compounds which are soluble in the dispersion medium, particularly preferably water-soluble metal salts.

The metal particles, metal compounds or metal salts as additives can be added during and/or after production of the dispersion.

The invention further provides a process which allows the dispersion of the invention to be produced in a very simple manner. In the process of the invention, amorphous $SiO_2$ particles having a round and compact shape are incorporated into an initially charged dispersion medium. The development of dilatant behavior should preferably be largely suppressed during this procedure.

In this process, the addition of fluidizers, in particular those containing organic components, can be completely omitted.

The development of dilatant behavior can be suppressed, for example, by the addition of the $SiO_2$ particles to the initially charged dispersion medium being carried out slowly and the mixture being stirred only very slowly at the beginning of the addition and more rapidly later towards the end of the addition. However, relatively high shear forces are to be avoided during the entire dispersion process, since shear forces lead to abrasion on the dispersion apparatus and the friction results in evolution of heat and thus has an adverse effect on the solids content.

In the dispersion procedure, the dispersion medium is charged initially and the $SiO_2$ particles are added slowly and preferably continually. However, the $SiO_2$ particles can also be added in a number of steps (a little at a time).

Selection of the $SiO_2$ particle size and grain sizes allows the particle size and distribution in the shaped body produced from the dispersion to be adjusted in a targeted way.

As dispersion apparatuses, it is possible to use all apparatuses and equipment known to those skilled in the art. Preference is given to apparatuses which contain no metal parts which could come into contact with the dispersion, in order to avoid metal contamination as a result of abrasion.

The dispersion procedure should be carried out at temperatures of from 0° C. to 50° C., preferably from 5° C. to 30° C.

Before and/or during and/or after the dispersion procedure, any gases present in the dispersion, e.g. air, can be removed by means of methods known to those skilled in the art, e.g. vacuum. This is preferably carried out during the dispersion procedure and/or after dispersion is complete.

A stable homogeneous dispersion having a solids content of at least 80% by weight, preferably 83% by weight and particularly preferably 86% by weight, produced in this way remains pourable for at least 2 hours, preferably for 30 minutes, particularly preferably for at least 10 minutes.

A further object of the present invention is to provide a simple, quick and cheap process by means of which porous and amorphous shaped $SiO_2$ bodies having an extremely high solids content can be produced from the dispersions of the invention, without suffering from the disadvantages known from the prior art.

This object is achieved by a process comprising the following steps:
1) production of a dispersion of $SiO_2$ particles,
2) transfer of the dispersion into a mold,
3) removal of the shaped body after solidification of the dispersion,
4) drying of the shaped body, wherein a solids content of at least 80% by weight of $SiO_2$ particles is achieved in the production of the dispersion of $SiO_2$ particles.

Before the dispersion is transferred to a mold (step 2), the dispersion can be additionally subjected to a pH change by means of mineral acids or bases.

Preferred acids are HCl, HF, $H_3PO_4$, $H_2SO_4$ or silicic acid, and preferred bases are $NH_3$, NaOH and KOH. Particular preference is given to HCl, HF or $NH_3$ and NaOH, very particularly preferably HF and $NH_3$. The addition of the acid or base should result in a pH of 2–7 or 7–11, preferably 3–5 or 9–10.

The transfer of the dispersion into a mold is carried out in a manner known to those skilled in the art, e.g. by pouring into a mold.

Shaping can be carried out at temperatures of from 0° C. to the boiling point of the dispersion medium. Preference is given to temperatures of from 20° C. to 30° C.

Suitable molds are in principle all molds known to those skilled in the art. Depending on the desired shaped body, it is possible to use molds with or without a core. Furthermore, the molds can be one-piece or made up of a number of parts. Crucible-like molds are preferably conical with an angle of at least 1° in order to aid removal from the mold.

Suitable materials are in principle all materials as are customarily used in the field of ceramics. Preference is given to materials which display little adhesion to the dispersion, e.g. plastics, silicones, glass, fused silica or graphite. Particular preference is given to polyethylene (PE), polypropylene (PP), polytetrafluoroethylene (PTFE), polyamide, silicone rubber and graphite. Very particular preference is given to PTFE and graphite.

It is also possible to use coated materials, e.g. metals coated with PTFE.

The mold preferably has a very smooth surface, e.g. a polished surface.

The mold can be porous or nonporous and permeable or impermeable to gas. Preference is given to a mold which is permeable to gas. Furthermore, the mold can be elastic or inelastic.

In a particular embodiment, the mold comprises a film or a tube made of film. This type of mold is particularly suitable for the production of rods and tubes, as described in EP 318100.

As film, it is in principle possible to use any type of film. Preference is given to films made of materials such as PE, PP, PET, PTFE, cellulose, fiber-reinforced cellulose or polyamide.

In a particular embodiment, the mold withdraws part of the dispersion medium from the dispersion. Here, all types of slip casting known to those skilled in the art can be carried out, for example as described in DE-A 2218766. In this way, the solids content of the shaped part can be increased to up to 95% by weight during shaping.

Furthermore, a rotationally symmetric shaped body can also be obtained by means of shaping methods known to those skilled in the art, e.g. turning processes, roller processes or spin casting processes.

Pressure casting processes known to those skilled in the art from the ceramics field can also be used.

Furthermore, a shaped body can also be shaped internally and/or externally on a shaped body provided. All methods known to those skilled in the art can be used for this, e.g. as described in EP 473104. This makes it possible to produce, for example, vitreous silica tubes or rods having porous internal and/or external regions. Shaped bodies consisting of different layers can also be produced in this way.

In step 3), the solidified dispersion is removed from the mold as a shape-stable shaped body. The time for solidification of the suspension depends on the solids content, the particle distribution, the temperature and the pH of the dispersion. Preferred temperatures for solidification are temperatures of from −196° C. to the boiling point of the dispersion medium; preference is given to temperatures of from −76° C. to 50° C., particularly preferably from −20° C. to 30° C. and very particularly preferably from 0° C. to 30° C.

In general, solidification to a shape-stable shaped body occurs within a period of from one minute to 24 hours; preference is given to times of from one minute to 6 hours, particularly preferably from one minute to 30 minutes.

During solidification of the dispersion to form a shape-stable shaped body, no appreciable shrinkage occurs. Preference is given to a linear shrinkage of from 0 to 0.5%.

If a small part of the dispersion medium can also escape from the mold by evaporation, this accelerates the solidification of the dispersion.

To enable the shaped body to be removed more readily from the mold without damage and formation of cracks, the mold can be provided with a suitable mold release agent known to those skilled in the art prior to filling with the dispersion of the invention. A preferred mold release agent is, for example, graphite.

The actual removal from the mold is carried out in a manner known to those skilled in the art.

Furthermore, removal from the mold is also possible by means of formation of a water layer between shaped body and mold, as would be generated, for example, by application of tension. All methods known to those skilled in the art are possible, for example those described in U.S. Pat. No. 5,578,101.

In step 4), the shaped body obtained from step 3) is dried. Drying is carried out by means of methods known to those skilled in the art, e.g. vacuum drying, drying by means of hot gases such as nitrogen or air or contact drying. A combination of the individual drying methods is also possible. Preference is given to drying by means of hot gases.

Preference is also given to drying by means of microwaves or infrared radiation.

According to the invention, it is naturally also possible in principle to carry out steps 3) and 4) in a different order.

Drying is carried out at temperatures in the shaped body of from 25° C. to the boiling point of the dispersion medium in the pores of the shaped body.

The drying times depend on the volume of the shaped body to be dried, the maximum thickness, the dispersion medium and the pore structure of the shaped body.

A small amount of shrinkage occurs on drying the shaped body. The shrinkage depends on the solids content of the moist shaped body. At a solids content of 80% by weight, the volume shrinkage is $\leq 2.5\%$ and the linear shrinkage is $\leq 0.8\%$. At a higher solids content, the shrinkage is lower.

In a particular embodiment, in which all steps are carried out using highly pure materials, the shaped body has an extraneous atom content, in particular of metals, of $\leq 300$ ppmw, preferably $\leq 100$ ppmw, particularly preferably $\leq 10$ ppmw and very particularly preferably $\leq 1$ ppmw.

The shaped body obtainable in this way is an amorphous, open-pored, close-to-final-dimensions shaped $SiO_2$ body of any dimensions and shape.

The shaped body obtainable in this way has a lower anisotropy in respect of the density than do shaped bodies obtainable according to the prior art.

These shaped bodies are characterized in that they comprise at least 64% by volume, preferably at least 70% by volume, of $SiO_2$ particles, and have a pore volume (determined by means of mercury porosimetry) of from 1 ml/g to 0.01 ml/g, preferably from 0.8 ml/g to 0.1 ml/g, particular preferably from 0.4 ml/g to 0.1 ml/g, and possess pores having a pore diameter of from 1 to 10 μm, preferably from 3 to 6 μm, which are sintering-stable up to 1000° C. or have pores having a bimodal pore diameter distribution with a pore diameter maximum in the range from 0.01 to 0.05 μm, preferably from 0.018 to 0.022 μm, and a second pore diameter maximum in the range from 1 to 5 μm, preferably from 1.8 to 2.2 μm.

Shaped bodies according to the invention can also have pores having a bimodal pore diameter distribution with a pore diameter maximum in the range from 0.01 to 0.05 μm, preferably from 0.018 to 0.022 μm, and a second pore diameter maximum in the range from 1 to 5 μm, preferably from 1.8 to 2.2 μm, with the pore diameter distribution altering on heating in such a way that a monomodal pore diameter distribution is present at 1000° C. and at this temperature the pore diameter is in the range from 2.2 to 5.5 μm, preferably from 3.5 to 4.5 μm and the internal surface area of the shaped body is from 100 $m^2/g$ to 0.1 $m^2/g$, preferably from 50 $m^2/g$ to 0.1 $m^2/g$.

The shaped bodies of the invention are preferably sintering-stable in respect of their volume up to 1000° C.

The use of relatively large particles in the dispersion produces larger pores in the shaped body and a narrow particle size distribution in the dispersion results in a narrow pore size distribution in the shaped body.

The addition of small amounts (from about 1 to 4% by weight) of nanosize particles has no appreciable influence on the monomodal pore size distribution with pore sizes in the lower microns region in the shaped body.

The addition of relatively large amounts (from about 5 to 50% by weight) of nanosize particles results in a bimodal pore size distribution in the shaped body which contains not only the pores mentioned but also pores in the lower nanometer range.

In all cases, the total solids content of the shaped body does not change.

The density of the shaped body of the invention is from 1.4 $g/cm^3$ to 1.8 $g/cm^3$.

The above-described shaped bodies having a monomodal pore size distribution are sintering-stable for at least 24 hours at up to 1000° C. Furthermore, they are thermally stable and have a very low coefficient of thermal expansion.

The shaped bodies of the invention preferably have a flexural strength of from 0.1 $N/mm^2$ to 20 $N/mm^2$, particularly preferably from 0.5 to 10 $N/mm^2$, in particular from 0.8 to 10 $N/mm^2$. These shaped bodies therefore display a higher flexural strength than green bodies having a monomodal particle size distribution, as are known from the prior art. Furthermore, an increased flexural strength can be achieved by heat treatment.

The shaped bodies described can, owing to their particular properties, be used in many ways, e.g. as filter materials, thermal insulation materials, heat shields, catalyst support materials and also as "preform" for glass fibers, optical fibers, optical glasses or silica goods of all types.

In a further specific embodiment, the porous shaped bodies can be treated, completely or partly, with a wide variety of molecules, materials and substances. Preference is given to molecules, materials and substances which are catalytically active. Here, it is possible to employ all methods known to those skilled in the art, as are described, for example, in U.S. Pat. No. 5,655,046.

In a further specific embodiment, the open-pored green body has pores in the upper nanometer to lower micron range, preferably in a range from 0 to 10 µm. This makes rapid vacuum sintering possible, since the conditions are outside the Knudsen range.

In a further specific embodiment, the open-pored green body has pores having a bimodal distribution in the lower nanometer to lower micron range, preferably in the range from 1 to 20 nm and from 1 to 10 µm.

In a specific embodiment, the shaped bodies obtained in this way can be additionally subjected to sintering. Here, it is possible to use all methods known to those skilled in the art, e.g. vacuum sintering, zone sintering, sintering in an electric arc, sintering by means of plasma or laser, inductive sintering or sintering in a gas atmosphere or gas stream. Preference is given to vacuum sintering or sintering in a gas stream. Particular preference is given to vacuum sintering at pressures of 10–5 mbar or 10–3 mbar.

The temperatures necessary for sintering are from 1400° C. to 1700° C., preferably from 1500° C. to 1650° C.

The shaped body can be free-standing, lying or suspended or supported by any method known to those skilled in the art during sintering. Sintering in a sintering-stable mold is also possible. Here, preference is given to molds made of materials which do not lead to post-contamination of the body being sintered. Particular preference is given to molds made of graphite and/or silicon carbide and/or silicon nitride. If the shaped bodies to be sintered are crucibles, sintering on a mandrel comprising, for example, graphite, for example as described in DE 2218766, is also possible.

Furthermore, the shaped bodies can also be sintered in special atmospheres such as He or $SiF_4$ in order to achieve post-purification and/or enrichment of the body being sintered with particular atoms and molecules. Here, it is possible to use all methods known to those skilled in the art, for example as described in U.S. Pat. No. 4,979,971.

Furthermore, for post-purification it is also possible to use methods as are described, for example, in EP 199787.

Preferred substances for the post-purification are ones which form readily volatile compounds with the impurities, for example metal halides. Preferred substances are reactive gases, e.g. $Cl_2$ or HCl, and also readily decomposable materials such as thionyl chloride. Particular preference is given to the use of thionyl chloride above the decomposition temperature.

In this way, a 100% amorphous (no cristobalite), transparent, gas-impermeable sintered shaped vitreous silica body having a density of at least 2.15 g/cm³, preferably 2.2 g/cm³, can be produced.

In a particular embodiment, the sintered shaped vitreous silica body has no gas inclusions and preferably has a concentration of OH groups of ≦1 ppm.

In a particular embodiment, in which highly pure materials are employed in all steps, the sintered shaped body has an extraneous atom content, in particular of metals, of ≦300 ppmw, preferably ≦100 ppmw, particularly preferably ≦10 ppmw and very particularly preferably ≦1 ppmw.

The shaped vitreous silica bodies produced in this way are in principle suitable for all applications in which vitreous silica is used. Preferred fields of application are silica goods of all types, glass fibers, optical fibers and optical glasses.

A particularly preferred field of application is high-purity vitreous silica crucibles for the drawing of single silicon crystals.

In a further particular embodiment, the dispersions and/or the porous shaped bodies and/or the sintered vitreous silica bodies can be treated with molecules, materials and substances which give the respective shaped bodies additional properties.

For example, incorporation of silicon particles and/or aluminum oxide and/or titanium oxide, as described in U.S. Pat. No. 4,033,780 and U.S. Pat. No. 4,047,966, alters the optical properties of the sintered shaped bodies by reduction of the number of SiOH groups and reduction of the water content. Furthermore, the silicon particles reduce the oxygen content of the sintered shaped body.

In addition, the shape stability during sintering or during thermal stressing of the sintered shaped body can be increased or influenced. In a further particular embodiment, the dispersion and/or the porous shaped body is treated completely or partly with compounds which promote or effect cristobalite formation. Here, it is possible to use all compounds known to those skilled in the art which promote and/or effect cristobalite formation, as described, for example, in EP 0753605, U.S. Pat. No. 5,053,359 or GB 1428788. Preference is given to BaOH and/or aluminum compounds.

Furthermore, as described in U.S. Pat. No. 4,018,615, complete or partial cristobalite formation can be achieved when crystalline $SiO_2$ particles are added to the dispersion and/or the porous shaped body. The crystalline particles should have the particle sizes which are described further above for the amorphous particles.

Sintering of such a shaped body gives shaped bodies which have a cristobalite layer inside and/or outside or consist entirely of cristobalite. If the sintered shaped bodies are, in particular, crucibles for the drawing of single Si crystals, these are particularly suitable for crystal drawing since they have a higher thermal stability and, for example, contaminate a silicon melt to a lesser extent. This enables a higher yield to be obtained in crystal drawing.

A reduction in the migration of impurities during the drawing of single crystals can also be achieved by the presence of aluminum or aluminum-containing substances in the drawing crucible, as described in DE 19710672. This can be achieved by addition of appropriate particles or dissolved substances to the dispersion and/or the porous shaped body.

The following examples and comparative examples serve to illustrate the invention.

EXAMPLE 1

170 g of twice-distilled $H_2O$ were placed in a 600 ml plastic beaker. Using a commercial propeller stirrer, 45 g of fumed silica (Aerosil® OX 50 from Degussa, BET surface area: 50 m²/g) were firstly stirred in over a period of 15 minutes. Subsequently, 845 g of fused silica (Excelica® SE-15 from Tokuyama, mean particle size: 15 µm) were added, quickly at first and finally in smaller portions, and dispersed for a few minutes. During this procedure, the rotational speed of the stirrer was gradually increased from an initial 400 rpm to 2000 rpm.

After the solids had been completely dispersed, the dispersion was subjected to a slightly reduced pressure (0.8 bar) for 10 minutes so as to remove any enclosed air bubbles.

The dispersion produced in this way contained 890 g of solid, which corresponds to a solids content of 83.96% by weight (of this, 94.94% was fused silica and 5.06% was fumed silica).

Part of the dispersion was poured into two rectangular molds which were made of PTFE and were open at the top (5 cm×15 cm×2 cm). After 4 hours, the two shaped bodies were removed from the molds by dismantling the molds and were dried in a drying oven at 200° C. The dried shaped bodies had a density of 1.62 g/cm$^3$.

A pore volume of 0.20 ml/g and an internal surface area of 30 m$^2$/g were determined by means of mercury porosimetry.

One shaped body was sintered in a high vacuum (10$^{31}$ $^5$ mbar) by heating it at a heating rate of 2° C./min to 1620° C. and holding it at this temperature for one minute.

The sintered shaped body obtained in this way had a density of 2.2 g/cm$^3$ and comprised 100% amorphous, transparent, gas-impermeable vitreous silica having no gas inclusions and an OH group content of less than 1 (quantitative determination by means of transmission IR spectroscopy).

The measurable shrinkage compared to the porous shaped body was, on a volume basis, 26.37%, which corresponds to a linear shrinkage of 10%.

The second shaped body was likewise heated in a high vacuum (10$^{-5}$ mbar) to 1620° C. at a heating rate of 2° C./min. When the temperature reached 400° C., 600° C., 800° C., 1000° C., 1200° C., 1400° C. and 1600° C., the density of the shaped body was determined in each case. The density of the shaped body determined in this way is shown as a function of the sintering temperature in Table 1.

TABLE 1

Density of the shaped body as a function of the sintering temperature.

| Temperature [° C.] | Density [g/cm$^3$] |
|---|---|
| 200 | 1.62 |
| 400 | 1.61 |
| 600 | 1.63 |
| 800 | 1.62 |
| 1000 | 1.63 |
| 1200 | 1.68 |
| 1400 | 1.81 |
| 1600 | 2.20 |

BRIEF DESCRIPTION OF THE DRAWINGS

FIG. 2 shows the pore size distribution of the shaped body.

Figure 1:
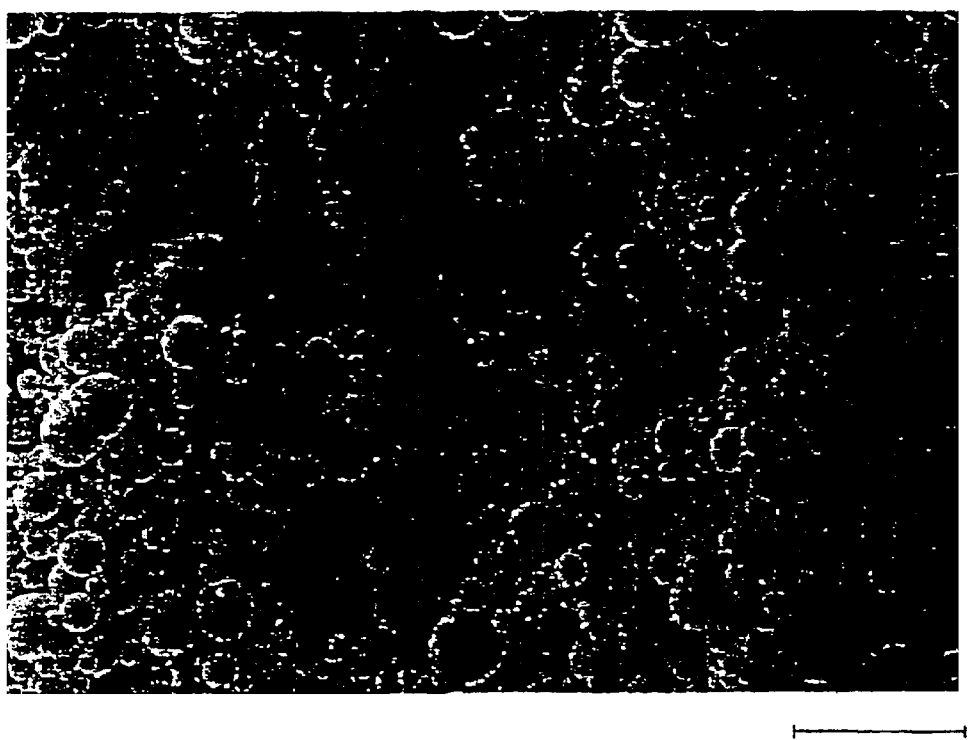
FIG. 1 shows a scanning electron micrograph of the shaped body dried at 200° C.

In addition, the pore size distribution of the shaped body achieved at temperatures of 200° C., 600° C., 1000° C., 1200° C. and 1400° C. was in each case determined by means of mercury porosimetry. This pore size distribution is shown in FIG. 2.

In addition, the pore volume and the internal pore surface area of the specimens at the abovementioned temperatures were determined. The result is shown in Table 2.

TABLE 2

Pore volume and internal pore surface area (by means of mercury porosimetry)

| Specimen | Pore volume [ml/g] | Internal surface area [m$^2$/g] |
|---|---|---|
| 200° C. | 0.24 | 33.23 |
| 600° C. | 0.22 | 33.068 |
| 1000° C. | 0.21 | 27.78 |
| 1200° C. | 0.18 | 8.217 |
| 1400° C. | 0.097 | 2.01 |

EXAMPLE 2a to c:

a) (Comparative Example) 170 g of twice-distilled H$_2$O were placed in a 600 ml plastic beaker. While stirring by means of a commercial propeller stirrer, 890 g of fused silica (Excelica® SE-15 from Tokuyama, mean particle size: 15 μm) were added, quickly at first and finally in smaller portions, and dispersed over a period of a few minutes.

b) 170 g of twice-distilled H$_2$O were placed in a 600 ml plastic beaker. Using a commercial propeller stirrer, 45 g of fumed silica (Aerosil® OX 50 from Degussa, BET surface area: 50 m$^2$/g) were firstly stirred in over a period of 15 minutes. Subsequently, 845 g of fused silica (Excelica® SE-15 from Tokuyama, mean particle size: 15 μm) were added, quickly at first and finally in smaller portions, and dispersed over a period of a few minutes.

c) 170 g of twice-distilled H$_2$O were placed in a 600 ml plastic beaker. Using a commercial propeller stirrer, 90 g of fumed silica (Aerosil® OX 50 from Degussa, BET surface area: 50 m$^2$/g) were firstly stirred in over a period of 15 minutes. Subsequently, 800 g of fused silica (Excelica® SE-15 from Tokuyama, mean particle size: 15 μm) were added, quickly at first and finally in smaller portions, and dispersed over a period of a few minutes.

In all three variants, the rotational speed of the stirrer was initially 400 rpm and was gradually increased to 2000 rpm.

After the solids had been dispersed completely, all three dispersions were subjected to a slightly reduced pressure (0.8 bar) for 10 minutes so as to remove any enclosed air bubbles.

The dispersions produced in this way comprised 890 g of solid, which corresponds to a solids content of 83.96% by weight. The proportion of fumed silica was 0% by weight in dispersion a), 5.06% by weight in b) and 10.12% by weight in c).

The dispersions were each poured into 10 rectangular molds which were made of PTFE and were open at the top (5 cm×10 cm×2 cm). After 4 hours, the shaped bodies were removed from the mold by dismantling the mold and dried in a drying oven at 200° C. After drying, some of the specimens were additionally heat-treated at 800° C. and 1100° C. for one hour in each case.

The flexural strength was subsequently determined by means of a 3-point bending test.

TABLE 3

Flexural strength (N/mm$^2$) as a function or the proportion of nanosize amorphous SiO$_2$ particles and heat treatment (1 hour)

| | Heat treatment | | |
|---|---|---|---|
| | 200° C. | 800° C. | 1100° C. |
| 0% of nanosize particles (see Example 2a) | 0.2 N/mm$^2$ | 1.2 N/mm$^2$ | 1.6 N/mm$^2$ |
| 5% of nanosize particles (see Example 2b) | 0.8 N/mm$^2$ | 1.9 N/mm$^2$ | 4.2 N/mm$^2$ |
| 10% of nanosize particles (see Example 2c) | 0.8 N/mm$^2$ | 1.7 N/mm$^2$ | 3.9 N/mm$^2$ |

As can be seen from Table 3, a bimodal particle size distribution leads to an increased flexural strength. If the strength of the shaped bodies from Table 3 is compared with the strengths reported in JP 5-294610 (specimens dried at 300° C.), the prior art gives, at a comparable pH of the dispersion of about 6.5, a strength of 0.01 N/mm$^2$ while the strength obtained using the process of the invention (Examples 2b, 2c) is up to 0.8 N/mm$^2$, which corresponds to a factor of up to 80.

COMPARATIVE EXAMPLE 1

Using a method based on EP 653381, silicon dioxide was milled in a ball mill until the particle size was in the range from >0.45 μm to <50 μm, with the main proportion of about 60% being in the range from 1 μm to 10 μm. On attempting to produce, as in Example 1, a dispersion having a solids content of ≧80% by weight, the dispersion suddenly became solid at a solids content of 79% by weight. Transfer of the mass into a mold was no longer possible.

COMPARATIVE EXAMPLE 2

Using a method based on EP 318100, an attempt was made to disperse pyrogenic silica having a BET surface area of 50 m$^2$/g in water. On attempting, as in Example 1, to produce a dispersion having a solids content of ≧80% by weight, the dispersion suddenly became solid at a solids content of as low as 42% by weight. Transfer of the mass into a mold was no longer possible. Even when using ammonium fluoride as fluidizer, a solids content of only 48% by weight was able to be obtained in the dispersion. Transfer of the mass into a mold was again not possible.

What is claimed is:

1. A homogeneous, pourable dispersion of amorphous SiO$_2$ particles in a dispersion medium, comprising a dispersion with a solids content of at least 80% by weight of amorphous SiO$_2$ particles having a bimodal particle size distribution comprising larger amorphous SiO$_2$ particles and smaller amorphous SiO$_2$ particles.

2. The dispersion of claim 1, which has a solids content of at least 83% by weight of amorphous SiO$_2$ particles.

3. The dispersion of claim 1, wherein a polar or nonpolar organic solvent, water, or a mixture thereof is present as a dispersion medium.

4. The dispersion of claim 3, wherein water having a resistance of ≧18 megaohm*cm is present as a dispersion medium.

5. The dispersion of claim 1, wherein the larger amorphous SiO$_2$ particles have a round and compact morphology.

6. The dispersion of claim 1, wherein the larger amorphous SiO$_2$ particles have a particle size distribution with a d$_{50}$ of 1–200 μm.

7. The dispersion of claim 6, wherein the larger amorphous SiO$_2$ particles have a BET surface area of 0.001 m$^2$/g–50 m$^2$/g.

8. The dispersion of claim 1, wherein the smaller amorphous SiO$_2$ particles are present in an amount of from 0.1 to 50% by weight.

9. The dispersion of claim 1, wherein the specific density of the amorphous SiO$_2$ particles is from 1.0 to 2.2 g/cm$^3$.

10. The dispersion of claim 1, wherein the amorphous SiO$_2$ particles have ≦3 OH groups per nm$^2$ on their surface.

11. The dispersion of claim 1, wherein the larger amorphous SiO$_2$ particles are post-sintered silica, amorphous sintered SiO$_2$, or compacted SiO$_2$.

12. The dispersion of claim 1, wherein the SiO$_2$ particles present have a content of atoms of other than silicon and oxygen of less than 300 parts per million by weight based on 1 million parts of SiO$_2$ particles by weight.

13. A process for producing the dispersion of claim 1, comprising incorporating amorphous SiO$_2$ particles having an essentially round and compact shape into an initially charged dispersion medium such that dilatant behavior is suppressed.

14. A process for producing a porous and amorphous shaped SiO$_2$ body having an extremely high solids content, comprising the steps:
 a) producing the SiO$_2$ particle dispersion of claim 1
 b) transferring the dispersion into a mold, and allowing said dispersion to solidify and form a shaped body;
 c) removing the shaped body from the mold; and
 d) drying the shaped body,
  wherein the dispersion of SiO$_2$ particles has a solids content of at least 80% by weight of SiO$_2$.

15. The process of claim 14, wherein the dispersion and/or the porous shaped body prepared therefrom is treated with one or more compounds which promote or effect cristobalite formation.

16. An amorphous open-pored, shaped SiO$_2$ green body having dimensions close to the desired final dimensions of a sintered shaped body prepared therefrom, produced by the process of claim 14.

17. An amorphous, open-pored shaped SiO$_2$ body of claim 16 which has a flexural strength of from 0.1 N/mm$^2$ to 20 N/mm$^2$.

18. An amorphous, open-pored shaped SiO$_2$ body of claim 6 which comprises at least 64% by volume of SiO$_2$ particles and has a pore volume (determined by means of mercury porosimetry) of from 1 ml/g to 0.01 ml/g and possesses pores having a pore diameter of from 1 to 10 μm which are sintering-stable up to 1000° C. or has pores having a bimodal pore diameter distribution with a pore diameter maximum in the range from 0.01 to 0.05 μm and a second pore diameter maximum in the range from 1 to 5 μm.

19. An amorphous, open-pored shaped SiO$_2$ body of claim 16 which comprises pores having a bimodal pore diameter distribution with a pore diameter maximum in the range from 0.01 to 0.05 μm and a second pore diameter maximum in the range from 1 to 5 μm, with the pore diameter distribution altering on heating such that a monomodal pore diameter distribution is present at 1000° C. and at this temperature the pore diameter is in the range from 2.2 to 5.5 μm and the internal surface area of the shaped body is from 100 m$^2$/g to 0.1 m$^2$/g.

20. The shaped SiO$_2$ body of claim 16, which is sintering-stable with respect of its volume up to 1000° C.

21. A 100% amorphous, transparent, gas-impermeable, sintered shaped vitreous silica body having a density of at least 2.15 g/cm$^3$, prepared from a dispersion of claim 1.

22. The shaped vitreous silica body of claim 21 containing no gas inclusions.

23. The shaped vitreous silica body of claim 21 which has a concentration of OH groups of $\leq 1$ ppm.

24. The shaped vitreous silica body of claim 21 which has an extraneous metal atom content of $\leq 300$ ppmw.

25. A shaped body of claim 21 which comprises a crucible for the drawing of single silicon crystals.

26. A pourable dispersion comprising 80 weight percent of more of amorphous $SiO_2$ particles in a dispersion medium of water having a conductivity of <18 megohm*cm, said $SiO_2$ particles having a bimodal particle size distribution, and comprising $SiO_2$ particles having a mean particle size of 1 nm to 400 nm in an amount of from 0.1 to 50 weight percent based on the weight of solids in said dispersion, and from 50 weight percent to 99.9 weight percent of $SiO_2$ particles having a $d_{50}$ of from 1 μm to 200 μm.

27. A pourable dispersion comprising 80 weight percent of more of amorphous $SiO_2$ particles in a dispersion medium, said $SiO_2$ particles having a bimodal particle size distribution, and comprising $SiO_2$ particles having a mean particle size of 1 nm to 400 nm in an amount of from 0.1 to 50 weight percent based on the weight of solids in said dispersion, and from 50 weight percent to 99.9 weight percent of $SiO_2$ particles having a $d_{50}$ of from 1 μm to 200 μm wherein the $SiO_2$ particles having a $d_{50}$ from 1 μm have an essentially sherical morphology.

* * * * *